(12) United States Patent
Rogovin

(10) Patent No.: US 6,477,454 B1
(45) Date of Patent: Nov. 5, 2002

(54) METHOD AND APPARATUS FOR CONTROLLING A POWER WINDOW SYSTEM USING A MOTOR TORQUE PARAMETER

(75) Inventor: Dan Rogovin, Thousand Oaks, CA (US)

(73) Assignee: Meritor Light Vehicle Technology L.L.C., Troy, MI (US)

( * ) Notice: Subject to any disclaimer, the term of this patent is extended or adjusted under 35 U.S.C. 154(b) by 71 days.

(21) Appl. No.: 09/587,832

(22) Filed: Jun. 6, 2000

(51) Int. Cl.[7] .................................................. G06F 7/00
(52) U.S. Cl. ............................ 701/36; 318/567; 701/49
(58) Field of Search .............................. 701/33, 35, 36, 701/49; 324/66, 503, 539; 318/1, 566, 567; 307/9.1, 10.1

(56) References Cited

U.S. PATENT DOCUMENTS 5,315,232 A * 5/1994 Stewart ........................ 324/72
5,854,555 A * 12/1998 Sasaki ....................... 324/539
6,253,135 B1 * 6/2001 Habacher ..................... 701/49

* cited by examiner

Primary Examiner—William A. Cuchlinski, Jr.
Assistant Examiner—Edward Pipala
(74) Attorney, Agent, or Firm—Suiter & Associates P

(57) ABSTRACT

A method and apparatus for controlling a power window system using a motor torque parameter value are disclosed. The motor of the power window system is operated under varying operating conditions such that resulting torque parameter values may be obtained. The torque parameter values are tabulated according to corresponding operating conditions such that the control system of the power window system is capable of operating the power window based upon the table values. Based upon the determined torque parameter values, the control system is capable of determining the amount of time to apply power to the motor in order to achieve a predetermined amount of angular rotation of the rotor and displacement of the power window, and the table of values may be utilized in current prediction and window location algorithms.

18 Claims, 3 Drawing Sheets

METHOD AND APPARATUS FOR CONTROLLING A POWER WINDOW SYSTEM USING A MOTOR TORQUE PARAMETER

FIELD OF THE INVENTION

The present invention generally relates to the field of automotive systems, and particularly to power window systems.

BACKGROUND OF THE INVENTION

In a power window system, it is desirable to precisely control the motor that causes the window to move, for example upwards or downwards. For a given motor and characteristic parameters such as the motor torque constant ($K_t$) or the armature constant ($K_a$), a given input current will cause the rotor to rotate a predetermined amount of angular rotation in a given time. For a consistent system of units, the motor torque constant and the armature constant are equivalent. With knowledge of the torque parameter constant for a given motor, the time and current required to cause the motor to turn a given amount of angular rotation, and thus the position of the window, can be determined. However, the motor torque parameter value for a given motor will change with age and operating conditions such as applied voltage and temperature. It would therefor be highly desirable to provide a system and a method by which the position of a power window may be determined and controlled with a greater precision by accurately determining the motor torque value of the motor utilized to drive the window.

SUMMARY OF THE INVENTION

The present invention is directed to a system and method for operating a power window system by using a torque parameter value of the motor of the power window system. A table of torque parameter values for corresponding operating conditions is generated, and the motor is operated according the table of operating conditions. The table of torque parameter values and operating conditions may be updated to reflect any changes in the characteristics of the motor over time, and the motor may then be operated according to the updated table values.

It is to be understood that both the foregoing general description and the following detailed description are exemplary and explanatory only and are not restrictive of the invention as claimed.

The accompanying drawings, which are incorporated in and constitute a part of the specification, illustrate an embodiment of the invention and together with the general description, serve to explain the principles of the invention.

BRIEF DESCRIPTION OF THE DRAWINGS

The numerous advantages of the present invention may be better understood by those skilled in the art by reference to the accompanying figures in which.

DETAILED DESCRIPTION OF THE INVENTION

Reference will now be made in detail to the presently preferred embodiment of the invention, an example of which is illustrated in the accompanying drawings.

Figure 1:
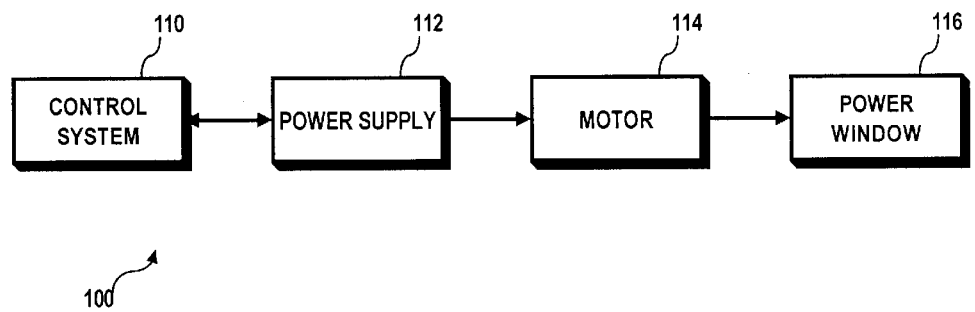
FIG. 1 is a block diagram of a power window system in accordance with the present invention.

Referring now to FIG. 1, a block diagram of a power window system in accordance with the present invention will be discussed. Power window system 100 includes a control system 110 coupled to power supply 112. Control system 110 controls the application of power to motor 114 such that power window 116 is caused to move (e.g., up or down) in response to a control signal provided by control system 110. Power supply 112 includes the battery of the vehicle in which power system 100 is utilized, and may further include other power systems, for example, an alternator and power regulation and conditioning circuitry. Control system 110 may receive an input from a vehicle operator, for example via the use of a window control actuator or switch to cause power window 116 to be raised or lowered according to the desire of the operator. Control system 110 may be, for example, a computer, microcontroller or digital logic based system or the like that is capable of electronically processing an input and providing an appropriate control signal as an output capable of being processed by power window system 100 to implement a control function corresponding to the input. An example of a computer hardware system suitable to be implemented as control system 110 is discussed with respect to FIG. 2.

Figure 2:
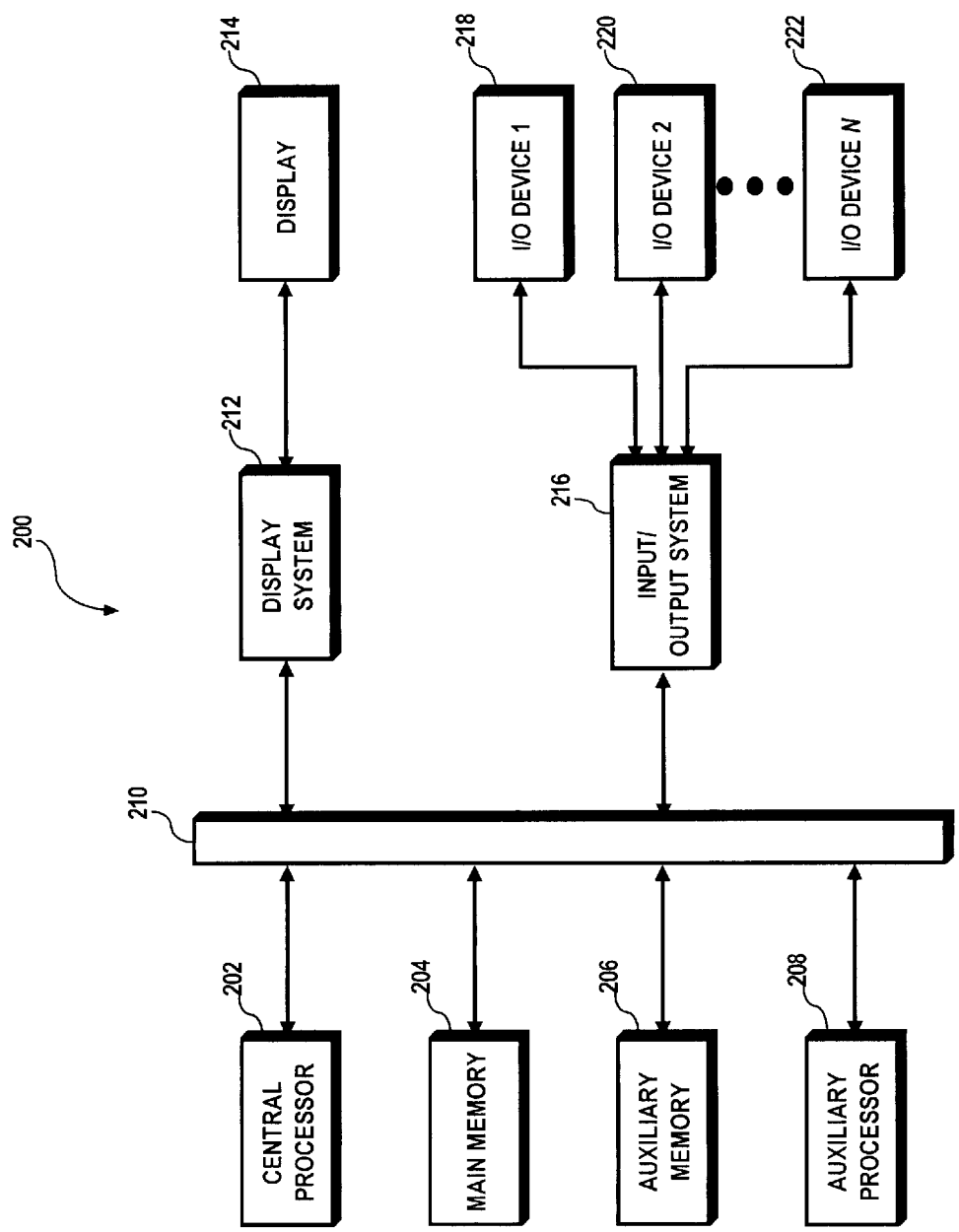
FIG. 2 is a block diagram of a computer based control system capable of being utilized in a power window system in accordance with the present invention.

Referring now to FIG. 2, a hardware system in accordance with the present invention is shown. The hardware system shown in FIG. 2 is generally representative of the hardware architecture of a computer system embodiment of the present invention. Computer system 200 may be configured to implement one or more subsystems of power window system 100 of FIG. 1, for example, as an embodiment of control system 110. A central processor 202 controls computer system 200. Central processor 202 includes a central processing unit such as a microprocessor or microcontroller for executing programs, performing data manipulations and controlling the tasks of computer system 200. Communication with central processor 202 is implemented through a system bus 210 for transferring information among the components of computer system 200. Bus 210 may include a data channel for facilitating information transfer between storage and other peripheral components of computer system 200. Bus 210 further provides the set of signals required for communication with central processor 202 including a data bus, address bus, and control bus. Bus 210 may comprise any state of the art bus architecture according to promulgated standards, for example industry standard architecture (ISA), extended industry standard architecture (EISA), Micro Channel Architecture (MCA), peripheral component interconnect (PCI) local bus, standards promulgated by the Institute of Electrical and Electronics Engineers (IEEE) including IEEE 488 general-purpose interface bus (GPIB), IEEE 696/S-100, and so on. Furthermore, bus 210 may be compliant with any promulgated industry standard. For example, bus 210 may be designed in compliance with any of the following bus architectures: Industry Standard Architecture (ISA), Extended Industry Standard Architecture (EISA), Micro Channel Architecture, Peripheral Component Interconnect (PCI), Universal Serial Bus (USB), Access.bus, IEEE P1394, Apple Desktop Bus (ADB), Concentration Highway Interface (CHI), Fire Wire, Geo Port, or Small Computer Systems Interface (SCSI), for example.

Other components of computer system 200 include main memory 204, auxiliary memory 206, and an auxiliary processor 208 as required. Main memory 204 provides storage of instructions and data for programs executing on central processor 202. Main memory 204 is typically semiconductor based memory such as dynamic random access memory (DRAM) and or static random access memory (SRAM). Auxiliary memory 206 provides storage of instructions and data that are loaded into the main memory 204 before execution. Auxiliary memory 206 may include semiconductor-based memory such as read-only memory (ROM), programmable read-only memory (PROM) erasable programmable read-only memory (EPROM), electrically erasable read-only memory (EEPROM), or flash memory (block oriented memory similar to EEPROM). Auxiliary memory 206 may also include a variety of non-semiconductor based memories, including but not limited to magnetic tape, drum, floppy disk, hard disk, optical, laser disk, compact disc read-only memory (CD-ROM), digital versatile disk read-only memory (DVD-ROM), digital versatile disk random-access memory (DVD-RAM), etc. Other varieties of memory devices are contemplated as well. Computer system 200 may optionally include an auxiliary processor 208 which may be a digital signal processor (a special-purpose microprocessor having an architecture suitable for fast execution of signal processing algorithms), a back-end processor (a slave processor subordinate to the main processing system), an additional microprocessor or controller for dual or multiple processor systems, or a coprocessor.

Computer system 200 further includes a display system 212 for connecting to a display device 214, and an input/output (I/O) system 216 for connecting to one or more I/O devices 218, 220, up to N number of I/O devices 222. Display system 212 may comprise a video display adapter having all of the components for driving the display device, including video random access memory (VRAM), buffer, and graphics engine as desired. Display device 214 may comprise a cathode ray-tube (CRT) type display such as a monitor or television, or may comprise alternative type of display technologies such as a liquid-crystal display (LCD), a light-emitting diode (LED) display, or a gas or plasma display. Input/output system 216 may comprise one or more controllers or adapters for providing interface functions between one or more of I/O devices 218–222. For example, input/output system 216 may comprise a serial port, parallel port, infrared port, network adapter, printer adapter, radio-frequency (RF) communications adapter, universal asynchronous receiver-transmitter (UART) port, etc., for interfacing between corresponding I/O devices such as a mouse, joystick, trackball, track pad, track stick, infrared transducers, printer, modem, RF modem, bar code reader, charge-coupled device (CCD) reader, scanner, compact disc (CD), compact disc read-only memory (CD-ROM), digital versatile disc (DVD), video capture device, touch screen, stylus, electro-acoustic transducer, microphone, speaker, etc. Input/output system 216 and I/O devices 218–222 may provide or receive analog or digital signals for communication between computer system 200 of the present invention and external devices, networks, or information sources. Input/output system 216 and I/O devices 218–222 preferably implement industry promulgated architecture standards, including Recommended Standard 232 (RS-232) promulgated by the Electrical Industries Association, Infrared Data Association (IrDA) standards, Ethernet IEEE 802 standards (e.g., IEEE 802.3 for broadband and baseband networks, IEEE 802.3z for Gigabit Ethernet, IEEE 802.4 for token passing bus networks, IEEE 802.5 for token ring networks, IEEE 802.6 for metropolitan area networks, 802.11 for wireless networks, and so on), Fibre Channel, digital subscriber line (DSL), asymmetric digital subscriber line (ASDL), frame relay, asynchronous transfer mode (ATM), integrated digital services network (ISDN), personal communications services (PCS), transmission control protocol/Internet protocol (TCP/IP), serial line Internet protocol/point to point protocol (SLIP/PPP), and so on. It should be appreciated that modification or reconfiguration of computer system 200 of FIG. 2 by one having ordinary skill in the art would not depart from the scope or the spirit of the present invention.

Figure 3:
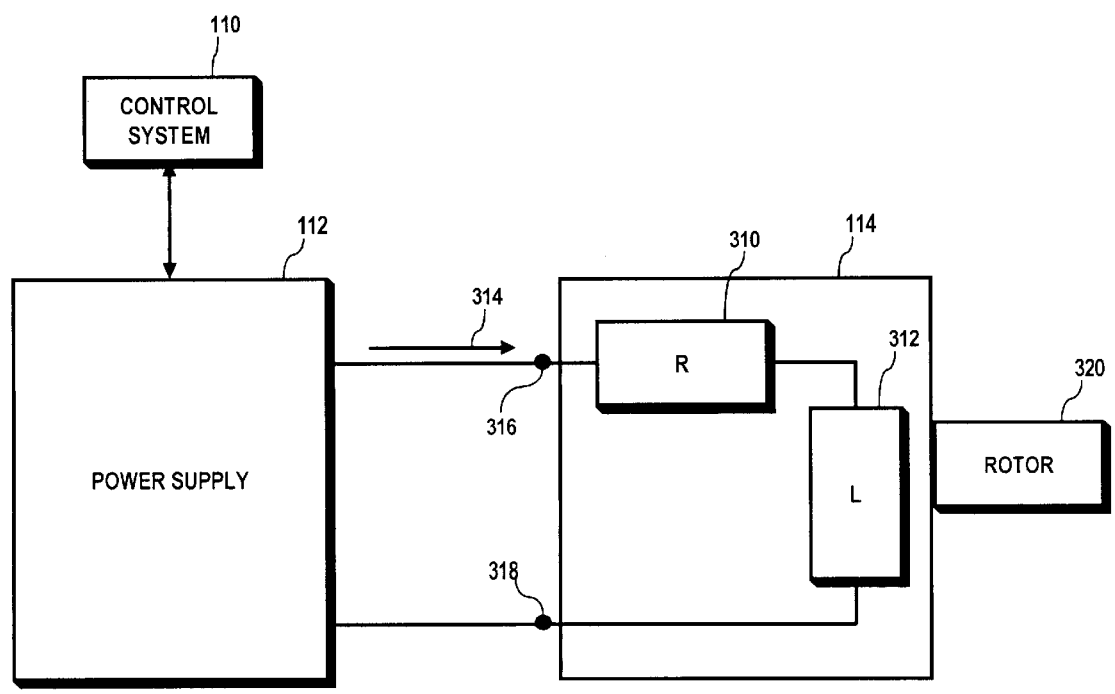
FIG. 3 is a block diagram showing further details of a power window system as shown in FIG. 1 in accordance with the present invention.

Referring now to FIG. 3, a block diagram showing further details of a power window system as shown in FIG. 1 in accordance with the present invention will be discussed. Rotor 320 is caused to rotate in response to the application of an input voltage $V_0$ to nodes 316 and 318 of motor 114 by power supply 112., which thereby causes a current 314 to flow into motor 114 and through motor resistance 310 and motor inductance 312.

When motor 114 is operated at steady state, the equation for the motor torque parameter is as follows:

$$K = \frac{V_0 - IR}{\omega \Phi}$$

where K is the motor torque parameter, $V_0$ is the voltage applied to motor 114 between nodes 316 and 318, I is the armature current 314, R is the armature resistance, $\omega$ is the angular speed of rotor 320 in radians per second, and $\Phi$ is the field winding flux and is proportional to the applied field winding current. Thus, values for the motor torque parameter may be obtained, for example, by operating power window 116 (e.g., in a constant downward motion from an upper position), measuring the time required for rotor 320 to rotate a given amount of turn (e.g., 36 degrees), and entering the values into the torque parameter equation, above. Torque parameter values may be generated under a range of operating conditions including, for example, armature voltage, armature current, field current, temperature, motor age, etc., wherein the results are compiled into a table. The table is then stored in control system 110, for example, in main memory 204 or auxiliary memory 206 of computer system 200 in a digital format for later retrieval. Using the information compiled in the table, the torque parameter equation can be solved for time such that control system 110 can calculate the amount of time required to operate motor 114 in order to obtain a predetermined amount of angular rotation of rotor 320 and thus a predetermined amount of linear movement of power window 116 by plugging in values from the table according the instant operating conditions of power window system 100 (e.g., temperature, armature voltage, age of motor 114, etc.). When motor 114 and power window system 100 is assembled at the factory, initial torque parameter values may be determined via testing under predetermined conditions. As power window system 100 is implemented during use over its lifetime (e.g., in a vehicle), control system 100 may periodically obtain new torque parameter values and update the table accordingly. Furthermore, torque parameter values may be averaged over all operating conditions, for example, so that an optimum value may be obtained and so that extreme or erratic values do not unacceptably skew the optimum or utilized value. In addition, statistical techniques may be applied to the values obtained, for example, values outside a standard deviation may be discarded and not utilized. Once torque parameter values are obtained, control system may utilize the tabulated values to determine an initial estimate for a selected value of armature current 314 to be applied to motor 114, and to verify the validity of applied current pulses according to a current pulse prediction and window position location algorithm. In one embodiment, the torque parameter values are determined and known to an accuracy of 3 percent.

Figure 4:
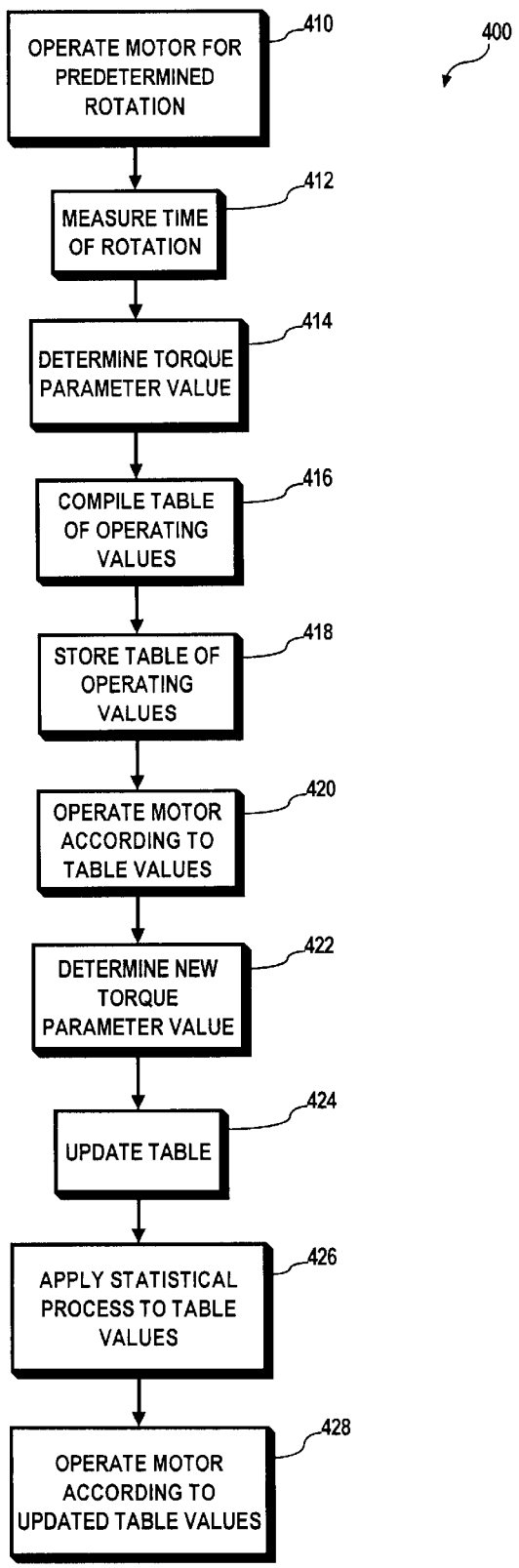
FIG. 4 is a flow diagram of a method for operating a power window system using a motor torque parameter value in accordance with the present invention.

Referring now to FIG. 4, a flow diagram of a method for controlling a power window based upon motor torque parameter values in accordance with the present invention will be discussed. The method 400 may be implemented as a program of instructions storable on a computer readable medium and which are capable of being interpreted by central processor 202 for causing computer system 200 to implement method 400. Although one order of the steps method 400 is disclosed is FIG. 4, the order of the steps of method 400 need not be limited to those shown such that other orders of the steps of method 400 may be implemented without departing from the scope of the invention. Method 400 is implemented by operating motor 114 for a predetermined amount of angular rotation of rotor 320 at step 410. Step 410 may be implemented one or more times under a range of operating conditions such as multiple values of armature voltages $V_0$, temperatures, etc. The resulting time or times required for rotor 312 to rotate a predetermined angular distance (e.g., 36 degrees) is measured at step 412 so that the resulting one or more resulting torque parameter values may be determined via calculation at step 414. The results of steps 410–414 are then compiled at step 416 into a table of operating values for motor 114 such that one or more torque parameter values are tabulated for corresponding operating conditions. The table of operating values is stored in an appropriate location at step 418, for example in main memory 204 or auxiliary memory 206 of computer system 200 in an embodiment wherein control system 100 includes computer system 200. Control system 110 then controls motor 114 at step 420 according to the operating values of motor 114 compiled in the stored table, for example, by retrieving the table from its stored location and applying a voltage and current to motor 114 to cause rotor 320 a predetermined amount of angular rotation for a predetermined duration. At least one or more new torque parameter values may then be determined at step 422, for example, after a predetermined amount of time or duty of use of motor 114. Alternatively, step 422 may be executed periodically. The table of operating values of motor 114 may then be updated at step 424, and at least one or more statistical processes may be applied to the table values at step 426, for example, torque parameter values may be averaged, regression analysis may be applied, etc. Control system 110 may then operate motor 114 at step 428 according to the updated table of operating values.

It is believed that the method and apparatus for controlling a power window system using a motor torque parameter of the present invention and many of its attendant advantages will be understood by the foregoing description, and it will be apparent that various changes may be made in the form, construction and arrangement of the components thereof without departing from the scope and spirit of the invention or without sacrificing all of its material advantages. The form herein before described being merely an explanatory embodiment thereof. It is the intention of the following claims to encompass and include such changes.

What is claimed is:

1. A method, comprising:
   operating a motor for a predetermined amount of angular rotation of a rotor of the motor under a predetermined set of operating conditions;
   measuring the amount of time of angular rotation of the rotor;
   determining a torque parameter based on said operating and said measuring steps;
   compiling a table of operating values for the motor based on said operating, said measuring, and said determining steps; and
   operating the motor based upon the table of operating values.

2. A method as claimed in claim 1, further comprising the step of storing the table such that the table is capable of being subsequently retrieved for a subsequent operating of the motor.

3. A method as claimed in claim 1, further comprising the steps of determining at least one or more torque parameter values for a corresponding step of operating condition in the table, and updating the table based upon the new torque parameter values.

4. A method as claimed in claim 1, further comprising the step of applying a statistical process to at least one or more operating values in the table.

5. A method as claimed in claim 1, further comprising the steps of determining at least one or more torque parameter values for a corresponding step of operating condition in the table, updating the table based upon the new torque parameter values, and subsequently operating the motor according to the updated table of operating values.

6. A program of instructions storable on a computer readable medium for causing a computer to implement steps for operating a power window system, the steps comprising:
   operating a motor for a predetermined amount of angular rotation of a rotor of the motor under a predetermined set of operating conditions;
   measuring the amount of time of angular rotation of the rotor;
   determining a torque parameter based on said operating and said measuring steps;
   compiling a table of operating values for the motor based on said operating, said measuring, and said determining steps; and
   operating the motor based upon the table of operating values.

7. A program of instructions as claimed in claim 6, the steps further comprising the step of storing the table such that the table is capable of being subsequently retrieved for a subsequent operating of the motor.

8. A program of instructions as claimed in claim 6, the steps further comprising the steps of determining at least one or more torque parameter values for a corresponding step of operating condition in the table, and updating the table based upon the new torque parameter values.

9. A program of instructions as claimed in claim 6, the steps further comprising the step of applying a statistical process to at least one or more operating values in the table.

10. A program of instructions as claimed in claim 6, the steps further comprising the steps of determining at least one or more torque parameter values for a corresponding step of operating condition in the table, updating the table based upon the new torque parameter values, and subsequently operating the motor according to the updated table of operating values.

11. An apparatus, comprising:

means, coupleable to a window, for moving the window disposed in a vehicle and capable of being disposed in at least two positions from a first one of the at least two positions to a second one of the at least two positions; and means for controlling said moving means, said controlling means being capable of determining a position of said moving means with respect to the window using a parameter of said moving means, the parameter of said moving means including a torque parameter value.

12. An apparatus as claimed in claim 11, said moving means comprising a motor having a rotor, said controlling means being capable of determining the amount of time to apply a power to the motor based upon the parameter of said moving means.

13. An apparatus as claimed in claim 11, said controlling means including a processor for implementing functions of said controlling means via a program of instructions interpretable by said processor.

14. An apparatus as claimed in claim 11, said controlling means including a microcontroller for implementing functions of said controlling means via microcontroller code interpretable by said microcontroller.

15. A vehicle, comprising:

a window disposed in the vehicle and capable of being disposed in at least two positions;

means, coupleable to said window, for moving the window from a first one of the at least two positions to a second one of the at least two positions;

means for controlling said moving means, said controlling means being capable of determining a position of said moving means with respect to the window using a parameter of said moving means; and an engine disposed in said vehicle, said engine being capable of providing propelling said vehicle and being capable of providing power to said moving means, the parameter of said moving means including a torque parameter value.

16. A vehicle as claimed in claim 15, said moving means comprising a motor having a rotor, said controlling means being capable of determining the amount of time to apply a power to the motor based upon the parameter of said moving means.

17. A vehicle as claimed in claim 15, said controlling means including a processor for implementing functions of said controlling means via a program of instructions interpretable by said processor.

18. A vehicle as claimed in claim 15, said controlling means including a microcontroller for implementing functions of said controlling means via microcontroller code interpretable by said microcontroller.

* * * * *